US009619404B2

(12) United States Patent
Chambliss et al.

(10) Patent No.: US 9,619,404 B2
(45) Date of Patent: Apr. 11, 2017

(54) BACKUP CACHE WITH IMMEDIATE AVAILABILITY

(71) Applicant: INTERNATIONAL BUSINESS MACHINES CORPORATION, Armonk, NY (US)

(72) Inventors: David D. Chambliss, Morgan Hill, CA (US); Ehood Garmiza, Neve Ziv (IL); Leah Shalev, Zichron-Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 893 days.

(21) Appl. No.: 13/863,772

(22) Filed: Apr. 16, 2013

(65) Prior Publication Data

US 2014/0310465 A1 Oct. 16, 2014

(51) Int. Cl.
| | |
|---|---|
| *G06F 12/00* | (2006.01) |
| *G06F 12/128* | (2016.01) |
| *G06F 12/0806* | (2016.01) |
| *G06F 12/0875* | (2016.01) |
| *G06F 11/16* | (2006.01) |
| *G06F 11/20* | (2006.01) |

(52) U.S. Cl.
CPC ........ *G06F 12/128* (2013.01); *G06F 11/1666* (2013.01); *G06F 12/0806* (2013.01); *G06F 12/0875* (2013.01); *G06F 11/1658* (2013.01); *G06F 11/20* (2013.01)

(58) Field of Classification Search
CPC .... G06F 12/00; G06F 3/0674; G06F 11/1446; G06F 11/1448; G06F 11/1451; G06F 11/1458
USPC ................. 711/100, 113, 114, 154, 200, 162
See application file for complete search history.

(56) References Cited

U.S. PATENT DOCUMENTS

| | | | |
|---|---|---|---|
| 5,636,359 A | 6/1997 | Beardsley et al. | |
| 5,724,501 A | 3/1998 | Dewey et al. | |
| 5,784,548 A | 7/1998 | Liong et al. | |
| 5,809,320 A * | 9/1998 | Jain ...................... | G06F 9/3857 712/34 |

(Continued)

FOREIGN PATENT DOCUMENTS

| | | |
|---|---|---|
| CN | 1664793 A | 9/2005 |
| CN | 101997918 A | 3/2011 |

(Continued)

OTHER PUBLICATIONS

Sivathanu, et al., Improving Storage System Availability with D-GRAID, ACM Transactions on Storage, vol. 1, No. 2, May 2005. http://pages.cs.wisc.edu/~muthian/dgraid-tos.pdf.

(Continued)

*Primary Examiner* — Tuan Thai
(74) *Attorney, Agent, or Firm* — Griffiths & Seaton PLLC

(57) ABSTRACT

Methods, apparatus and computer program products implement embodiments of the present invention that include defining, in a storage system including receiving, by a processor, metadata describing a first cache configured as a master cache having non-destaged data, and defining, using the received metadata, a second cache configured as a backup cache for the master cache. Subsequent to defining the second cache, the non-destaged data is retrieved from the first cache, and the non-destaged data is stored to the second cache.

17 Claims, 7 Drawing Sheets

(56) References Cited

U.S. PATENT DOCUMENTS

| | | | |
|---|---|---|---|
| 5,933,860 A * | 8/1999 | Emer | G06F 9/3806 |
| | | | 711/125 |
| 5,960,169 A | 9/1999 | Styczinski | |
| 6,012,123 A | 1/2000 | Pecone et al. | |
| 6,021,462 A | 2/2000 | Minow et al. | |
| 6,038,641 A * | 3/2000 | Zangenehpour | G06F 12/0866 |
| | | | 711/119 |
| 6,101,615 A | 8/2000 | Lyons | |
| 6,243,795 B1 * | 6/2001 | Yang | G06F 11/1666 |
| | | | 160/113 |
| 6,332,197 B1 | 12/2001 | Jadav et al. | |
| 6,505,216 B1 | 1/2003 | Schutzman et al. | |
| 6,529,995 B1 | 3/2003 | Shepherd | |
| 6,598,174 B1 | 7/2003 | Parks et al. | |
| 6,714,789 B1 | 3/2004 | Oh et al. | |
| 6,775,738 B2 | 8/2004 | Ash et al. | |
| 7,191,304 B1 | 3/2007 | Cameron et al. | |
| 7,454,656 B2 | 11/2008 | Okada et al. | |
| 7,593,974 B2 | 9/2009 | Suzuki et al. | |
| 7,657,509 B2 | 2/2010 | Clark et al. | |
| 7,849,356 B2 | 12/2010 | Jones et al. | |
| 7,945,732 B2 | 5/2011 | Koseki | |
| 7,987,158 B2 | 7/2011 | Boyd et al. | |
| 8,103,904 B2 | 1/2012 | Hafner et al. | |
| 8,112,395 B2 | 2/2012 | Patel et al. | |
| 8,156,368 B2 | 4/2012 | Chambliss et al. | |
| 8,494,063 B1 | 7/2013 | Reudink et al. | |
| 9,104,599 B2 | 8/2015 | Atkisson et al. | |
| 9,146,695 B2 | 9/2015 | Galloway et al. | |
| 2002/0091897 A1 | 7/2002 | Chiu et al. | |
| 2002/0170017 A1 | 11/2002 | Busser | |
| 2003/0204690 A1 | 10/2003 | Yamada et al. | |
| 2004/0093464 A1 | 5/2004 | Hassner et al. | |
| 2004/0128269 A1 | 7/2004 | Milligan et al. | |
| 2004/0139365 A1 * | 7/2004 | Hosoya | G06F 11/1666 |
| | | | 714/5.11 |
| 2005/0015436 A1 | 1/2005 | Singh et al. | |
| 2005/0055630 A1 | 3/2005 | Scanlan | |
| 2005/0289296 A1 | 12/2005 | Balasubramanian | |
| 2006/0123270 A1 | 6/2006 | Forhan et al. | |
| 2006/0294301 A1 | 12/2006 | Zohar et al. | |
| 2007/0016754 A1 | 1/2007 | Testardi | |
| 2007/0028145 A1 | 2/2007 | Gerhard et al. | |
| 2007/0067667 A1 | 3/2007 | Ikeuchi et al. | |
| 2007/0079083 A1 | 4/2007 | Gladwin et al. | |
| 2008/0040553 A1 | 2/2008 | Ash et al. | |
| 2008/0195807 A1 | 8/2008 | Kubo et al. | |
| 2008/0201608 A1 | 8/2008 | Forhan et al. | |
| 2008/0263274 A1 | 10/2008 | Kishi et al. | |
| 2009/0049050 A1 | 2/2009 | Whitehead | |
| 2009/0089612 A1 | 4/2009 | Mathew et al. | |
| 2009/0216832 A1 | 8/2009 | Quinn et al. | |
| 2010/0199125 A1 | 8/2010 | Reche | |
| 2011/0153606 A1 | 6/2011 | Kim et al. | |
| 2011/0161299 A1 | 6/2011 | Prahlad et al. | |
| 2011/0184915 A1 | 7/2011 | Wu et al. | |
| 2011/0202792 A1 | 8/2011 | Atzmony | |
| 2011/0208912 A1 | 8/2011 | Chambliss et al. | |
| 2011/0208922 A1 | 8/2011 | Coronado et al. | |
| 2011/0208943 A1 | 8/2011 | Schott | |
| 2011/0225453 A1 | 9/2011 | Spry et al. | |
| 2011/0258391 A1 | 10/2011 | Atkisson et al. | |
| 2011/0282835 A1 | 11/2011 | Cannon et al. | |
| 2011/0283062 A1 | 11/2011 | Kumagai et al. | |
| 2012/0110257 A1 | 5/2012 | Enohara et al. | |
| 2012/0210060 A1 | 8/2012 | Acuna et al. | |
| 2013/0024627 A1 | 1/2013 | Benhase et al. | |
| 2013/0232325 A1 | 9/2013 | Jang et al. | |
| 2014/0019421 A1 | 1/2014 | Jagadeesan | |
| 2014/0059291 A1 | 2/2014 | Memon et al. | |
| 2014/0310244 A1 | 10/2014 | Chambliss et al. | |
| 2014/0310456 A1 | 10/2014 | Chambliss et al. | |
| 2014/0310457 A1 | 10/2014 | Chambliss et al. | |
| 2014/0310464 A1 | 10/2014 | Chambliss et al. | |
| 2014/0310489 A1 | 10/2014 | Chambliss et al. | |
| 2014/0310557 A1 | 10/2014 | Chambliss et al. | |
| 2015/0268883 A1 | 9/2015 | Chambliss et al. | |
| 2015/0268884 A1 | 9/2015 | Chambliss et al. | |
| 2015/0269026 A1 | 9/2015 | Chambliss et al. | |

FOREIGN PATENT DOCUMENTS

| | | |
|---|---|---|
| CN | 102185929 A | 9/2011 |
| WO | 2014170791 A3 | 10/2014 |

OTHER PUBLICATIONS

Ripberger et al., "IBM System Storage DS8000 Storage Virtualization Overview," IBM, Apr. 13, 2010.

Rodeh, "B-trees, Shadowing and Clones," ACM Transactions on Computational Logic, vol. V, No. N, IBM, Aug. 2007.

* cited by examiner

BACKUP CACHE WITH IMMEDIATE AVAILABILITY

FIELD OF THE INVENTION

The present invention relates generally to data storage, and specifically to defining a backup cache with immediate availability to receive cache updates.

BACKGROUND

When processing I/O requests, computer storage systems typically implement read and write caches in order to enhance performance. A read cache typically comprises high-speed memory that is configured to store data that was recently retrieved from a disk, plus data that the computer system anticipates will be requested in the near future.

For example, if a storage system receives a read request to retrieve data from a specific physical region of a storage device, in addition to processing the retrieval request, the computer system may also retrieve data from physical regions on the storage device that follow the specific region, and load the retrieved data to the read cache. In operation, if a host computer issues a read request for data that is currently in the read cache, then the storage system conveys the data directly from the read cache to the host computer, thereby eliminating the need to physically retrieve the data from the disk. Read performance is therefore enhanced, since retrieving data from the read cache is much faster than retrieving the data from the disk.

When processing a write request received from a host computer, the storage system stores the write request data in the write cache, and then conveys an acknowledgement to the host computer that the data has successfully been written to the disk. Upon receiving the acknowledgement, the host computer can proceed as if the data has successfully been written to the disk. In operation, the storage system is configured to destage (i.e., transfer) data from the write cache to the disk at a subsequent time, typically when the write cache reaches a specific utilization level. Data stored in in the write cache that has not yet been destaged to the disk is referred to herein as "dirty" cache data. Write performance is therefore enhanced, since the write cache data (comprising data from multiple write requests) can usually be transferred to the disk in a smaller number of physical write operations than would have been required had each write request been individually stored to the disk.

The description above is presented as a general overview of related art in this field and should not be construed as an admission that any of the information it contains constitutes prior art against the present patent application.

SUMMARY

There is provided, in accordance with an embodiment of the present invention a method, including receiving, by a processor, metadata describing a first cache configured as a master cache having non-destaged data, defining, using the received metadata, a second cache configured as a backup cache for the master cache, retrieving, subsequent to defining the second cache, the non-destaged data from the first cache, and storing the non-destaged data to the second cache.

There is also provided, in accordance with an embodiment of the present invention a storage system, including a memory configured to store a first cache configured as a master cache having non-destaged data, and a processor configured to receive, metadata describing the first cache, to define, using the received metadata, a second cache configured as a backup cache for the master cache, to retrieve, subsequent to defining the second cache, the non-destaged data from the first cache, and to store the non-destaged data to the second cache.

There is further provided, in accordance with an embodiment of the present invention a computer program product, the computer program product including a non-transitory computer readable storage medium having computer readable program code embodied therewith, the computer readable program code including computer readable program code configured to receive metadata describing a first cache configured as a master cache having non-destaged data, computer readable program code configured to to define, using the received metadata, a second cache configured as a backup cache for the master cache, computer readable program code configured to retrieve, subsequent to defining the second cache, the non-destaged data from the first cache, and computer readable program code configured to store the non-destaged data to the second cache.

BRIEF DESCRIPTION OF THE DRAWINGS

The disclosure is herein described, by way of example only, with reference to the accompanying drawings, wherein.

DETAILED DESCRIPTION OF EMBODIMENTS

In some configurations, a computer storage system (also referred to herein as storage subsystem), may maintain a master cache and multiple backup caches, where the master cache and each of the multiple backup caches are stored on different physical nodes of the storage system. In order to ensure the continuous availability of data stored in the computer storage system, the computer storage system may be configured to maintain a specific number of backup caches. Therefore, in the event of a hardware and/or software of a first physical node storing one of the caches (i.e., the master cache or one of the backup caches), there may be instances when the computer storage subsystem needs to rapidly define and configure a second physical node to store an additional backup cache.

Embodiments of the present invention provide methods and systems for a storage system to define a backup cache. In some embodiments, the storage system defines the backup cache in two stages. In the first stage, the storage system uses metadata that describes the master cache to define an initial structure for a new backup cache. In some embodiments, the initial structure comprises pointers to non-destaged data in the master cache. Upon defining the initial structure for the new backup cache, the new backup cache can be configured to receive copies of any updates to the master cache. Therefore, embodiments of the present invention enable a new backup cache to be configured to accept updates from the master cache almost immediately after being defined.

In the second stage, the storage system completes the definition of the new backup cache by transferring, to the new backup cache, the non-destaged data referenced by the pointers. In some embodiments, the non-destaged data can be transferred to the new backup cache using remote direct memory access (RDMA), which typically has little or no performance impact on the storage system. Upon transferring the non-destaged data to the new backup cache, the backup cache is considered to be fully functional, and may be reconfigured as a master cache, if necessary.

Figure 1:
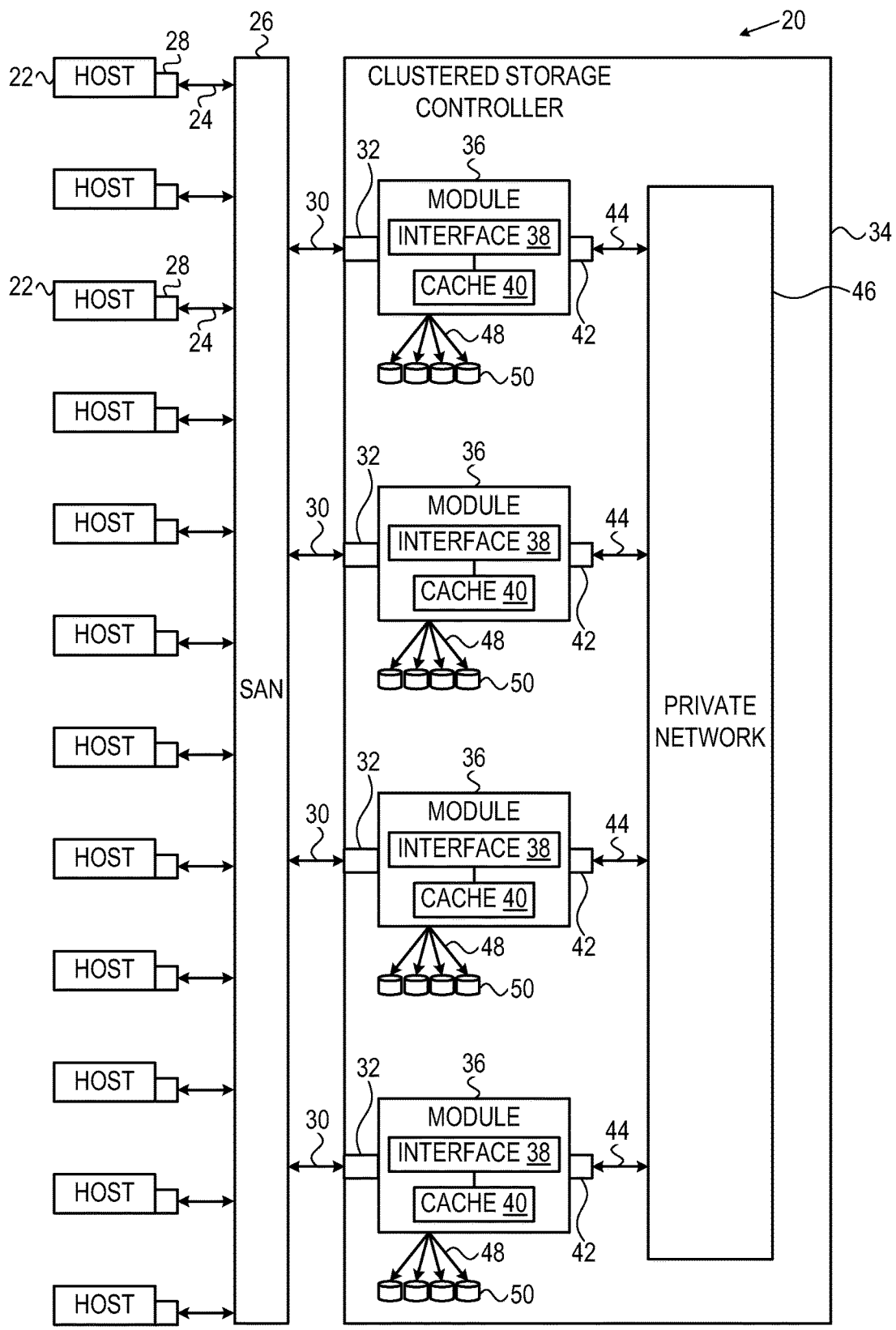
FIG. 1 is a block diagram that schematically illustrates a storage system, in accordance with an embodiment of the present invention.

FIG. 1 is a block diagram that schematically illustrates a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

While the configuration of storage subsystem 20 in FIG. 1 shows each module 36 comprising an adapter 32 that is configured to communicate with SAN 26, other configurations of the storage subsystem are considered to be within the spirit and scope of the present invention. For example, in an alternative configuration, adapter 32 is included in a subset of modules 36.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

While the configuration of storage subsystem 20 shown in Figure has the storage subsystem storing data to physical storage devices 50, other storage apparatuses are considered to be within the spirit and scope of the present invention. For example, storage subsystem 20 may store data to one or more data clouds or storage virtualization devices (SVD).

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

In operation, storage system 20 may store a given set of data in a storage management unit (SMU). Examples of storage management units include but are not limited to logical volumes, storage pools and slices. In the embodiments described herein, a slice comprises a set of partitions on a given storage device 50, and a logical volume may comprise multiple slices distributed among the multiple storage devices.

Figure 2:
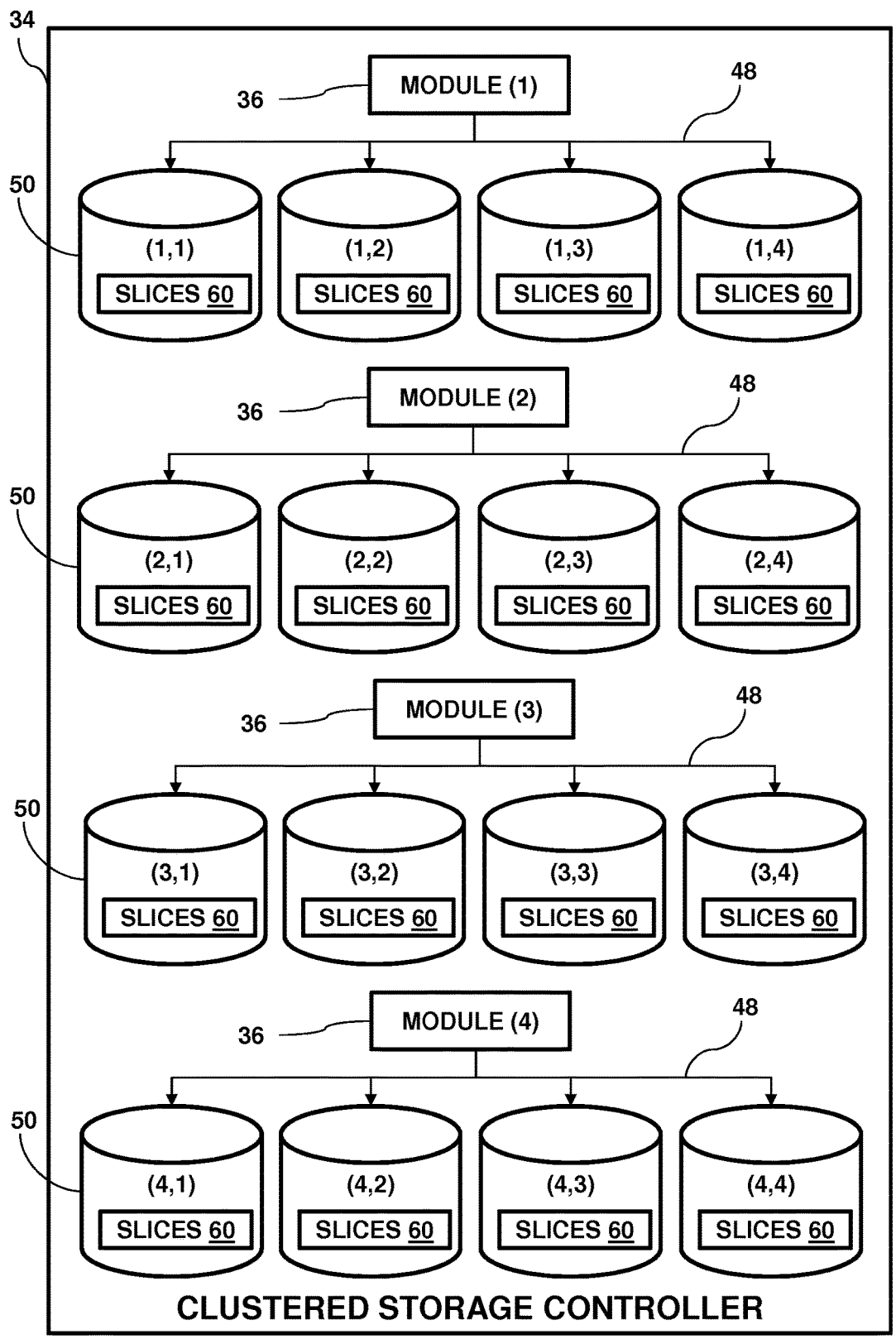
FIG. 2 is a block diagram that schematically illustrates an example of storage management units stored on a storage system, in accordance with an embodiment of the present invention.

FIG. 2 is a block diagram that schematically illustrates an example of storage management units (SMU) configured as slices 60 stored on storage devices 50 of clustered storage controller 34 (also referred to herein as a storage system), in accordance with an embodiment of the present invention. While the embodiments herein describe distributing metadata storage for slices 60, distributing metadata storage for other types of storage management units is considered to be within the spirit and scope of the present invention. For example, the embodiments described herein can be used to distribute metadata for other types of storage management units such as logical volumes and storage pools.

Additionally, in the embodiments described herein, each module 36 may be referenced by an identifier (A), where A is an integer representing a given module 36. As shown in FIG. 2, there are four modules 36 that may be referenced as module 36(1), module 36(2), module 36(3) and module 36(4).

Furthermore, each storage device 50 may be referenced by an ordered pair (A,B), where A is defined above, and where B is a number representing a given storage device 50 coupled to the given module via data connection 48. For example, storage devices 50(3,1), 50(3,2), 50(3,3) and 50(3, 4) are coupled to module 36(3) via data connection 48.

Figure 3A:
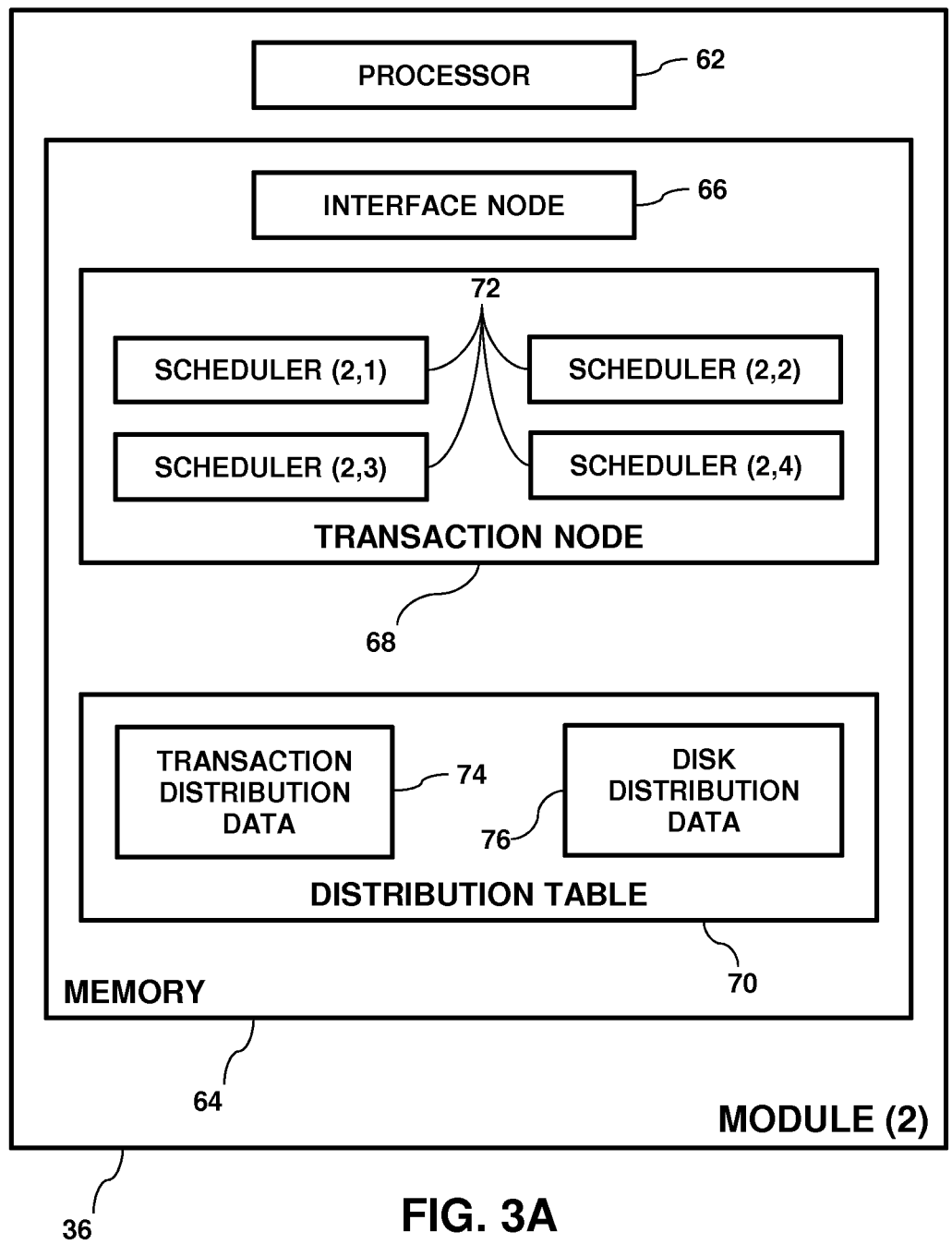
FIGS. 3A-3D, referred to collectively as FIG. 3, are block diagrams that schematically show functional elements of a module of the storage system, in accordance with an embodiment of the present invention.

FIG. 3A is a block diagram that schematically illustrates functional elements of module 36, in accordance with an embodiment of the present invention. Module 36 comprises a processor 62 and a memory 64. For a given module 36 configured to include adapter 32, memory 64 comprises an interface node 66 (i.e., not all memories 36 in storage system 20 include the interface node). Memory 36 also comprises a transaction node 68 and a distribution table 70. In operation, processor 62 executes interface node 66 and transaction node 68 from memory 64.

Processor 62 typically comprises a general-purpose computer, which is programmed in software to carry out the functions described herein. The software may be downloaded to processor 62 in electronic form, over a network, for example, or it may be provided on non-transitory tangible media, such as optical, magnetic or electronic memory media. Alternatively, some or all of the functions of processor 62 may be carried out by dedicated or programmable digital hardware components, or using a combination of hardware and software elements.

Interface node 66 comprises a software application that is configured to receive I/O requests from a given host computer 22, and to convey the I/O request to a given transaction node 68. Additionally, upon the given transaction node completing the I/O request, interface node 66 conveys a result of the I/O request to the given host computer. For example, if the I/O request comprises a write operation, then the conveyed result may comprise an acknowledgement of the write. Alternatively, if the I/O request comprises a read operation, then the conveyed result may comprise data retrieved from storage devices 50.

Transaction node 68 comprises a software application that processes I/O requests via multiple schedulers 72, which manage a set of slices 60. While the configuration of transaction node 68 shown in FIG. 3A comprises four schedulers 72, any number of schedulers is considered to be within the spirit and scope of the present invention. In some embodiments, processor 62 may execute each scheduler 72 on a separate thread (also known as a logical core) of the processor.

In embodiments described herein, each scheduler 72 may be referenced by an ordered pair (A,C), where A is defined above, and C is a number representing a given scheduler 72 executing within the given module. In the example shown in FIG. 3A, the first scheduler 72 in module 36(2) may be referred to herein as scheduler 72(2,1), the second scheduler 72 in module 36(2) may be referred to herein as scheduler 72(2,2), the third scheduler in module 36(2) may be referred to herein as scheduler 72(2,3), and the fourth scheduler 72 in module 36(2) may be referred to herein as scheduler 72(2,4).

As described supra, storage controller 34 may configure a logical volume as a set of slices 60, wherein each of the slices comprises a set of regions on a given storage device 50. For example, a given logical volume may comprise four slices 60 spread over storage devices 50(1,2), 50(2,3), 50(3,4) and 50(4,2). There may be instances where a given storage device stores more than one slice for a given logical volume. Additionally, as described in detail hereinbelow, processor 62 may store multiple copies of a given slice. For example, processor 62 may store a first copy of a given slice 60 on a first storage device 50 (also referred to herein as the primary storage device for the given slice), and an additional copy of the given slice on a second storage device 50 (also referred to herein as the secondary storage device for the given slice).

In embodiments of the present invention, each slice 60 can be associated with a first scheduler 72 that can be configured as a master scheduler, and one or more additional schedulers 72 that can be configured as backup schedulers. Differences between the master and the backup schedulers are described hereinbelow. In the event of a failure of the master scheduler, processor 62 can reconfigure one of the backup schedulers to function as the master scheduler, thereby ensuring the continuous availability of data stored in storage controller 34.

As described supra, processor 62 may store part of a first copy of a given slice 60 on a first data storage device 50, and the reminder of a first copy on a second data storage device 50, and parity data derived from the slice 60 on one or more parity storage devices 50. In the event of a failure of one of the data or parity storage devices, processor 62 can reconstruct the data that had been stored on the failed device from the data that can be read from the surviving devices. If more than one parity storage device is used according to a RAID-6 scheme then data recovery can be performed after failure of more than one of the storage devices. The data recovery ensures the continuous availability of data stored in storage controller 34.

Processor 62 can store associations between the slices, the schedulers and the storage devices to distribution table 70. Distribution table 70 comprises transaction distribution data 74 and disk distribution data 76. Transaction distribution data 74 can be configured to store associations between the slices and the schedulers, and disk distribution data 76 can be configured to store associations between the slices and the storage devices.

Figure 3B:
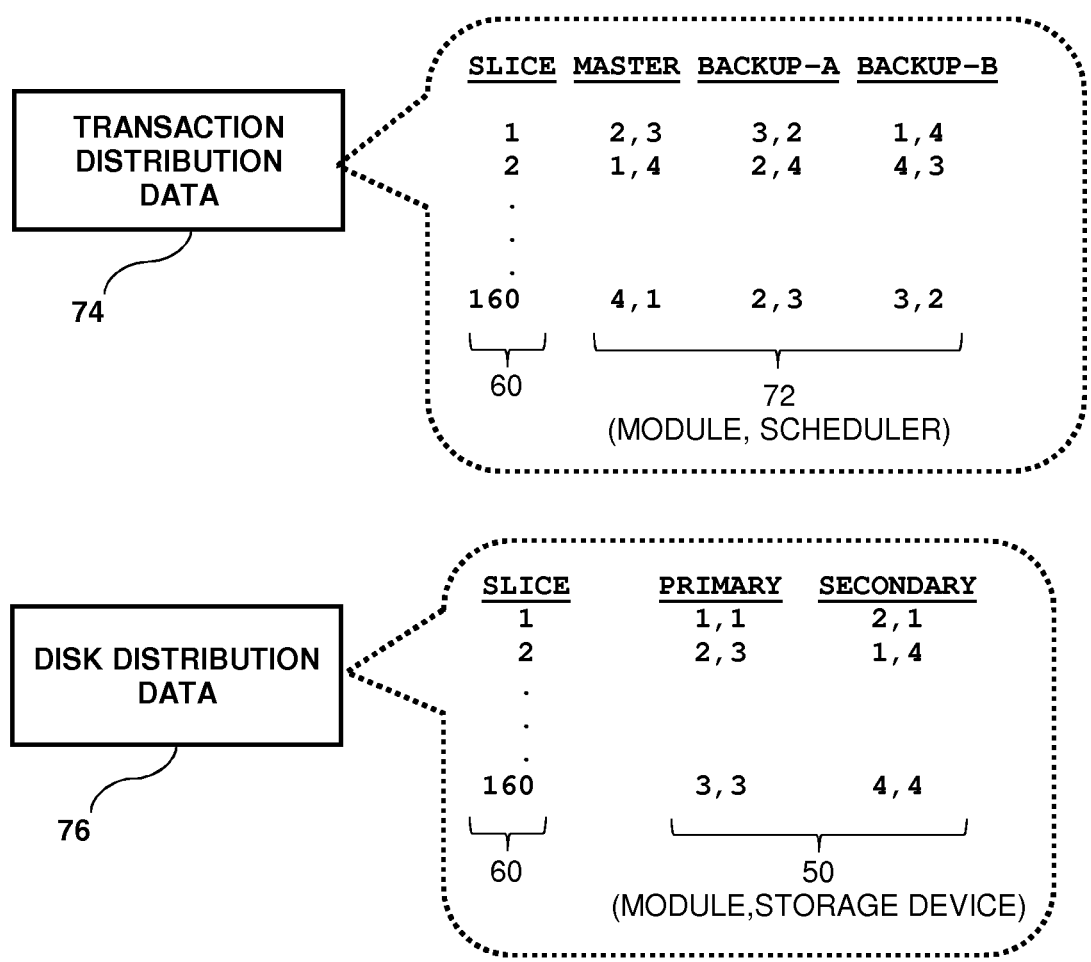

FIG. 3B is block diagram that schematically shows example entries in transaction distribution data 74 and disk distribution data 76, in accordance with an embodiment of the present invention. In the example shown in FIG. 3B, each slice 60 is associated with a master scheduler 72 and two backup schedulers 72, and a primary and a secondary storage device 50.

In the embodiments described herein, each slice may be referenced by an identifier (D), where D is a number representing a given slice 60. In the configuration shown in FIG. 3B-3D, storage controller 34 comprises 160 slices 60 that can be referenced as slice 60(1)-slice 60(160). Identifier D is also referred to herein as a slice number, so that each slice 60 has an associated slice number, and in the example D is an integer between 1 and 160.

As shown in transaction distribution data 74, scheduler 72(2,3) is configured as the master scheduler and schedulers 72(3,2) and 72(1,4) are configured as the backup schedulers (i.e., BACKUP-A and BACKUP-B as shown the Figure) for slice 160(1). Additionally, as shown in disk distribution data 76 for slice 60(1), storage device 50(1,1) is configured as a primary storage device and storage device 50(2,1) is configured as a secondary storage device.

As shown in the Figures, for a given slice 60 (i.e., a given SMU), the master scheduler, the backup scheduler(s), the primary storage device and the secondary storage device(s) can be distributed among different modules 36 of storage system 20. Additionally, each module 36 may store any number (including zero) of master and backup schedulers 72.

Figure 3C:
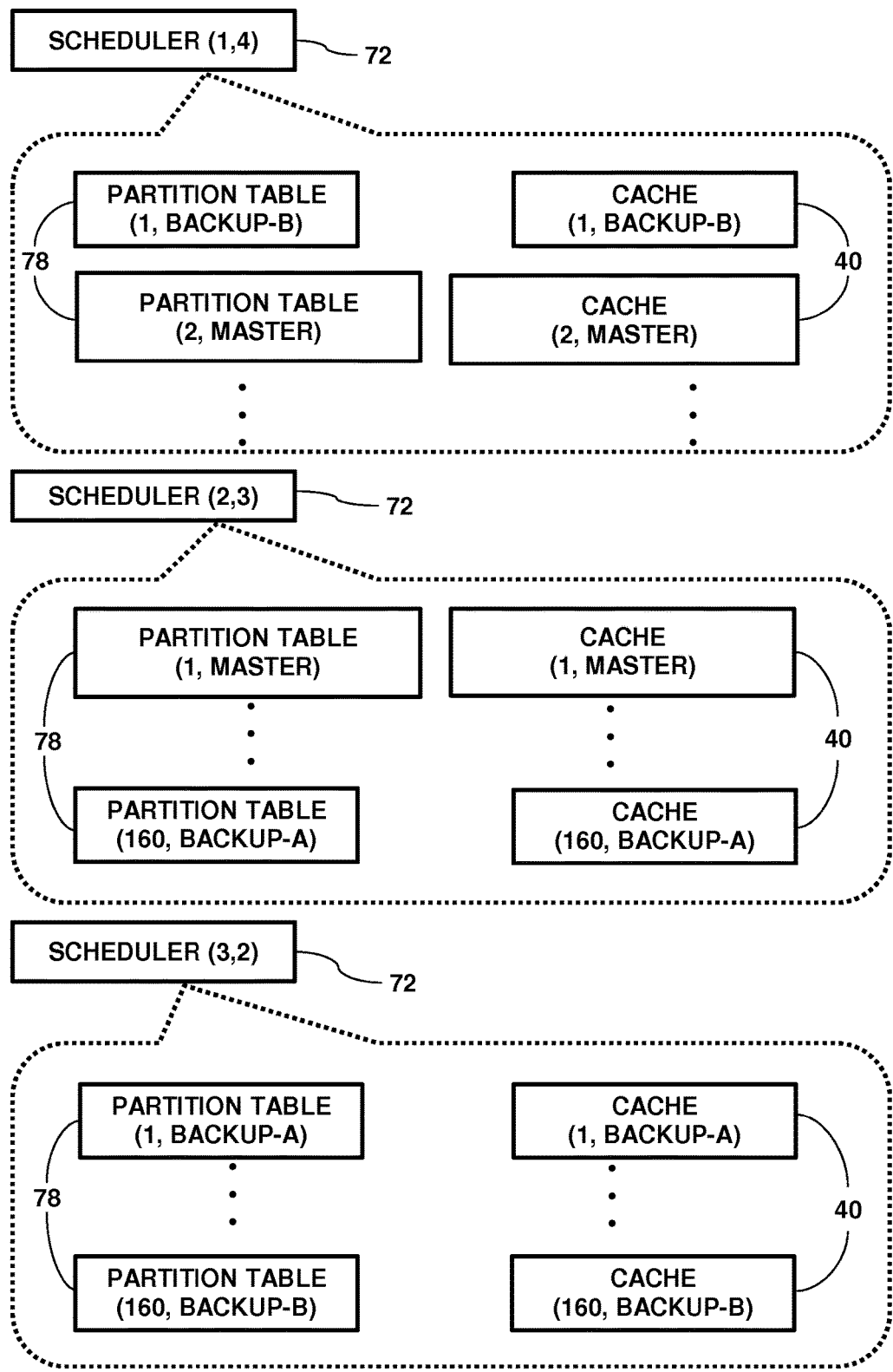

FIG. 3C is a block diagram that schematically illustrates schedulers 72(1,4), 72(2,3) and 72(3,2) in accordance with an embodiment of the present invention. Each scheduler 72 comprises pairs of partition tables 78 and caches 40, wherein each of the pairs is associated with a given slice 60. Each entry in a given partition table 78 corresponds to a partition (i.e., a region) on a given storage device 50, and comprises a data structure (e.g., an array) that enables processor 62 to map a given volume number and logical address to the partition. Operation of caches 40 is described in FIG. 1, hereinabove.

As described supra, each scheduler 72 can be associated with a given slice 60 and can function as either a master scheduler or a backup scheduler for the given slice. In the example shown in FIGS. 3B-3C, each slice 60 has a master scheduler 72 ("MASTER") and two backup schedulers 72 ("BACKUP-A" and "BACKUP-B"). Likewise, each partition table 78 may be referenced by an ordered pair (D,E), where D is a number representing a given slice 60, and E describes a role of a given partition table 78, and each cache 40 may be referenced by an ordered pair (D,F), where D is defined above, and F describes a role of a given cache 40. In embodiments described herein each slice 60 has a master cache 40 and two backup caches 40 (i.e., BACKUP-A and BACKUP-B).

Continuing the example described supra, the schedulers shown in FIG. 3C comprise the schedulers associated with slice 60(1). As shown in the Figure, scheduler 72(2,3) comprises partition table 78(1, MASTER) and cache 40(1, MASTER), scheduler 72(3,2) comprises partition table 78(1, BACKUP-A) and cache 40(1, BACKUP-A), and scheduler 72(1,4) comprises partition table 78(1, BACKUP-B) and cache 40(1, BACKUP-B).

In embodiments described herein, processor 62 can map an I/O request to a given scheduler 72, as opposed to mapping the I/O request to a given module 36 or a given storage device 50. By mapping I/O requests to schedulers 72, embodiments of the present convention "decouple" partition tables 78 from storage devices 50. In other words, upon receiving an I/O request, interface node 66 may convey the I/O request to a first module 36 executing a given scheduler 72 comprising a given partition table 78, wherein the given partition table references a given storage device 50 coupled to a second module 36.

Figure 3D:
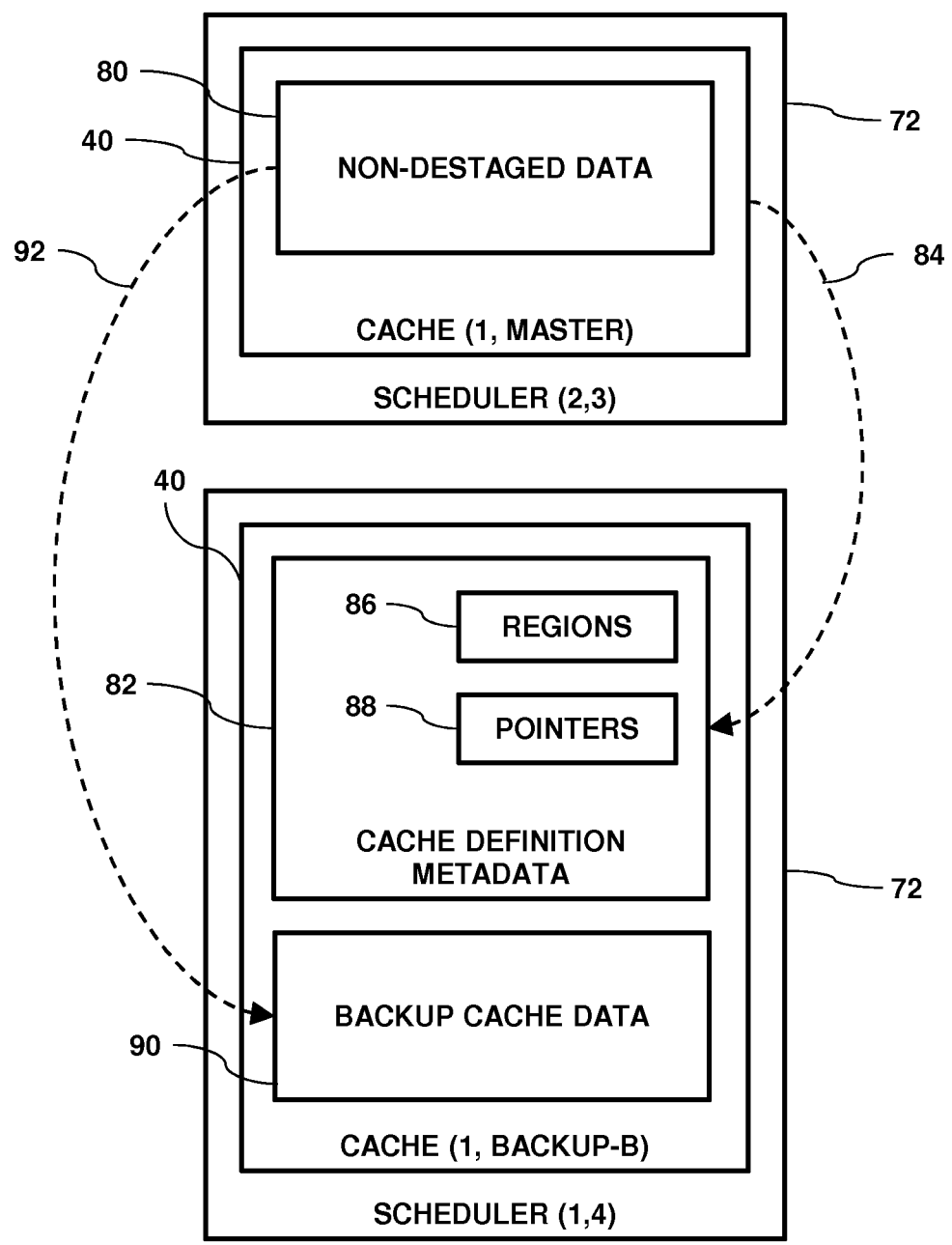

FIG. 3D is a block diagram that schematically illustrates the primary and the backup caches for slice 60(1), in accordance with an embodiment of the present invention. In the example shown in FIGS. 3D, scheduler 72(2,3) is configured as the master scheduler for slice 60(1), and comprises cache 40(1,MASTER). Cache 40(1,MASTER) comprises non-destaged data 80, which comprises data written to cache 40 that has not yet been destaged to storage devices 50(1,1) and 50(2,1) (i.e., the primary and the secondary storage devices for slice 160(1), as shown in FIG. 3B).

In operation, scheduler 72(2,3) can configure cache 40(1, BACKUP-B) 72(1,4) as the backup cache for slice 60(1) by first conveying cache metadata 82 to scheduler 72(1,4), as indicated by an arrow 84. Upon receiving cache metadata 82, scheduler 72(1,4) defines cache 40(1,BACKUP-B), and stores the cache definition metadata to cache 40(1, BACKUP-B). Scheduler 72(1,4) can use cache definition metadata 82 to define an initial structure (i.e., a "skeleton") for the backup cache of slice 60(1).

Cache definition metadata 82 comprises a small set of information that describes cache 40(1,MASTER). Examples of cache definition metadata 82 include, but are not limited to:

A set of regions 86 on storage devices associated with the primary (and the backup) caches. For example, in the configuration shown in FIG. 3, the set of regions may comprise the regions on storage device 50(1,1) that are associated with partition table 78(1,MASTER). Scheduler 72(1,4) can use regions 86 to define a structure for backup cache data 90.

A set of pointers 88 (i.e., addresses) to each entry in non-destaged data 80.

In some embodiments, scheduler 72(2,3) can "package" the cache definition metadata as a single atomic update, and convey to scheduler 72(1,4). Packaging the cache definition metadata as a single atomic update can enable scheduler 72(2,3) to collect cache definition metadata 82, and to convey the cache definition metadata in between processing I/O requests, thereby minimizing any performance impact to storage controller 34 while defining cache 40(1,BACKUP-B).

Subsequent to scheduler 72(1,4) defining the outline for cache 40(1,BACKUP-B), scheduler 72(1,4) can complete the definition of the backup cache for slice 60(1) by retrieving, from non-destaged data 80, data referenced by pointers 88, and storing the retrieved data to backup cache data 90, as indicated by an arrow 92. In some embodiments, scheduler 72(1,4) can retrieve the non-destaged data using remote direct memory access (RDMA) requests, which can minimize any performance impact to storage controller 34.

While the configuration shown in FIGS. 2 and 3 describe embodiments of the present invention managing data in slices 60, other storage management units (e.g., volumes and storage pools) are considered to be within the spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more comp uter readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BACKUP CACHE DEFINITION

Figure 4:
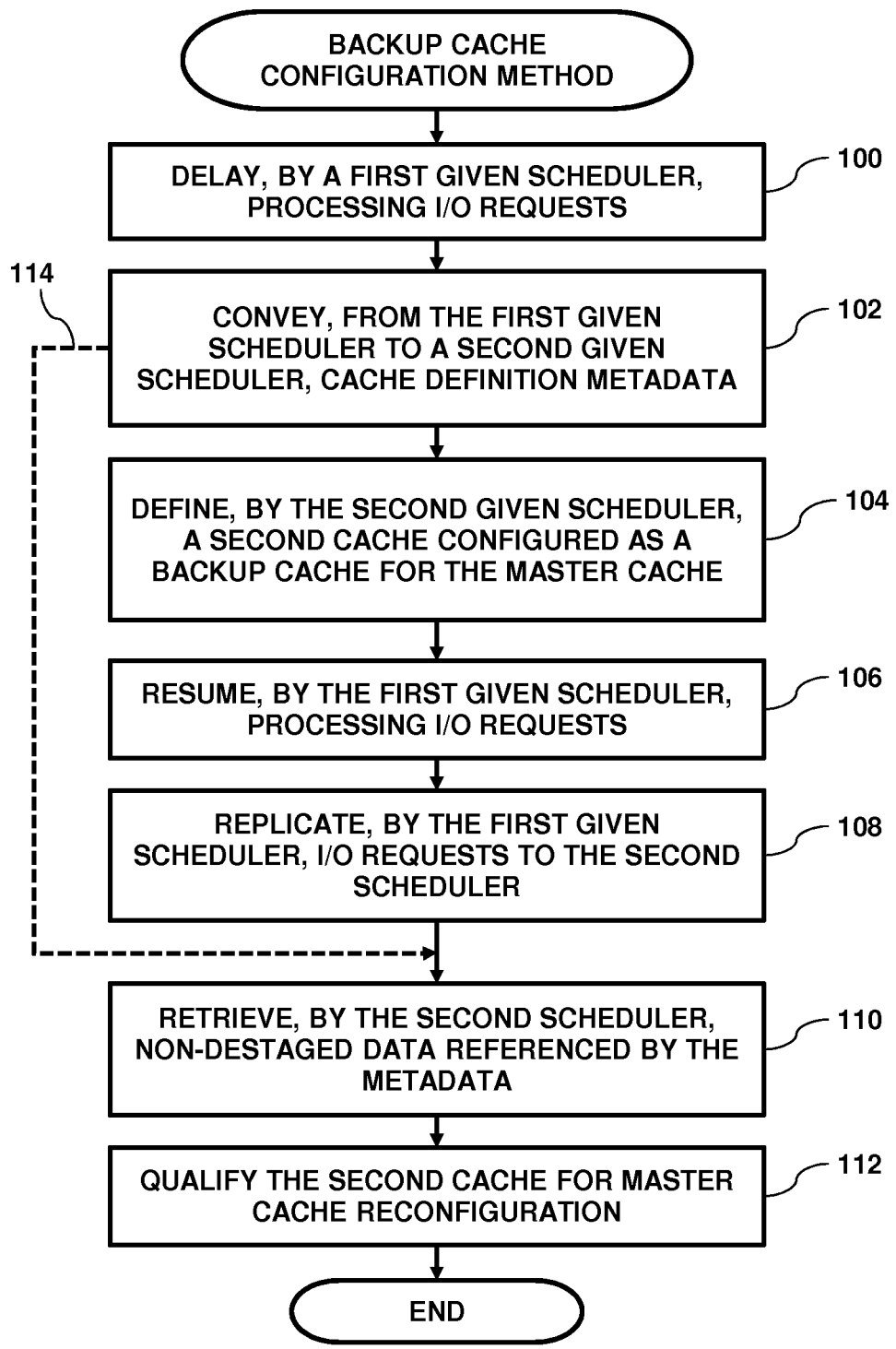
FIG. 4 is a flow diagram that schematically illustrates a method of configuring a backup cache, in accordance with an embodiment of the present invention.

FIG. 4 is a flow diagram that schematically illustrates a method of configuring a backup cache 40 for a given slice 60, in accordance with an embodiment of the present invention. In the embodiments described herein, cache 40(1, MASTER) may also referred to herein as a first cache, and cache 40(1,BACKUP-B) may also be referred to herein as a second cache. In a delay step 100, scheduler 72(2,3) delays processing I/O requests while the scheduler defines a backup cache 40 in steps 102 and 104 described hereinbelow.

In an cache initialization step 102, scheduler 72(2,3) conveys cache definition metadata 82 to scheduler 72(1,4). As described supra cache metadata 82 may comprise regions 86 and pointers 88. In a definition step 104, scheduler 72(1,4) defines, using the received cache definition metadata 82, cache 40(1,BACKUP-B) as a backup cache for cache 40(1,MASTER).

Upon defining cache 40(1,BACKUP-B), scheduler 72(2,3), in a resume step 106, resumes processing I/O requests and activates cache 40(1,BACKUP-B), and in an replicate step 108, scheduler 72(2,3) starts replicating I/O requests (i.e., conveys updates made to cache 40(1,MASTER)) to scheduler 72(1,4). In some embodiments, scheduler 72(1,4) may convey a message to scheduler 72(2,3) that cache 40(1,BACKUP-B) is configured to receive updates from cache 40(1,MASTER). When cache 40(1,BACKUP-A) is activated to receive updates, and scheduler 72(2,3) updates an entry in cache 40(1,MASTER), scheduler 72(2,3) conveys the updated entry to scheduler 72(1,4), and scheduler 72(1,4) updates cache 40(1,BACKUP-B) with the updated entry.

In a retrieval step 110, scheduler 72(1,4) retrieves entries from non-destaged data 80 referenced by pointers 88, and stores the retrieved entries to backup cache data 90 in cache 40(1,BACKUP-B). Since scheduler 72(1,4) is activated, cache (40,1, BACKUO-B) may receive updates from scheduler 72(2,3) (i.e., due to I/O requests) simultaneously with retrieving the entries from non-destaged data 80 referenced by pointers 88 (which may takes some time). In operation, scheduler 72(1,4) can perform steps 110 almost immediately after scheduler 72(2,3) perform step 102, and in parallel with steps 104, 106, and 108, as indicated by an arrow 114.

Finally, in a qualification step 112, scheduler 72(1,4) qualifies cache 40(1,BACKUP-B) for master cache reconfiguration, and the method ends. Upon the qualification of cache 40(1,BACKUP-B), cache 40(1,BACKUP-B) is "fully configured", and scheduler 72(1,4) can reconfigure cache 40(1,BACKUP-B) to replace cache 40(1,MASTER) as the master cache for the given slice. In operation, scheduler 72(1,4) can reconfigure cache 40(1,BACKUP-B) as the master cache in response to a hardware and/or a software failure in cache 40(1,MASTER) (or any hardware and/or software component of scheduler 72(2,3)).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a processor, metadata describing a first cache configured as a master cache having non-destaged data;
defining, using the received metadata, a second cache configured as a backup cache for the master cache;
retrieving, subsequent to defining the second cache, the non-destaged data from the first cache; and
storing the non-destaged data to the second cache;
wherein the metadata is selected from a list comprising a set of regions, on a storage device, that are associated with the first cache, and a set of pointers referencing the non-destaged data.

2. The method according to claim 1, and comprising upon defining the second cache, activating the second cache to accept updates from the first cache.

3. The method according to claim 1, wherein retrieving the non-destaged data comprises retrieving, from the first cache, the non-destaged data referenced by the pointers.

4. The method according to claim 1, and comprising, subsequent to storing the non-destaged data to the second cache, qualifying the second cache for master cache reconfiguration.

5. The method according to claim 4, and comprising, configuring the second cache as the master cache upon detecting a failure of the first cache.

6. The method according to claim 1, and comprising delaying, prior to receiving the metadata, processing input/output requests, and resuming the processing of the input/output requests upon defining the second cache.

7. A storage system, comprising:
a memory configured to store a first cache configured as a master cache having non-destaged data; and
a processor configured to receive, metadata describing the first cache, to define, using the received metadata, a second cache configured as a backup cache for the master cache, to retrieve, subsequent to defining the second cache, the non-destaged data from the first cache, and to store the non-destaged data to the second cache; wherein the processor is configured to select the metadata from a list comprising a set of regions, on a storage device, that are associated with the first cache, and a set of pointers referencing the non-destaged data.

8. The storage system according to claim 7, wherein the processor is configured to activate, upon defining the second cache, the second cache to accept updates from the first cache.

9. The storage system according to claim 7, wherein the processor is configured to retrieve the non-destaged data by retrieving, from the first cache, the non-destaged data referenced by the pointers.

10. The storage system according to claim 7, wherein the processor is configured to qualify, subsequent to storing the non-destaged data to the second cache, the second cache for master cache reconfiguration.

11. The storage system according to claim 10, wherein the processor is configured to configure the second cache as the master cache upon detecting a failure of the first cache.

12. The storage system according to claim 7, wherein the processor is configured to delay, prior to receiving the metadata, processing input/output requests, and to resume the processing of the input/output requests upon defining the second cache.

13. A computer program product, the computer program product comprising:
a non-transitory computer readable storage medium having computer readable program code embodied therewith, the computer readable program code comprising:
computer readable program code configured to receive metadata describing a first cache configured as a master cache having non-destaged data;
computer readable program code configured to define, using the received metadata, a second cache configured as a backup cache for the master cache;
computer readable program code configured to retrieve, subsequent to defining the second cache, the non-destaged data from the first cache and computer readable program code configured to store the non-destaged data to the second cache;

wherein the computer readable program code is configured to select the metadata from a list comprising a set of regions, on a storage device, that are associated with the first cache, and a set of pointers referencing the non-destaged data.

14. The computer program product according to claim 13, and comprising computer readable program code configured to activate, upon defining the second cache, the second cache to accept updates from the first cache.

15. The computer program product according to claim 13, wherein the computer readable program code is configured to retrieve the non-destaged data by retrieving, from the first cache, the non-destaged data referenced by the pointers.

16. The computer program product according to claim 13, and comprising computer readable program code configured to qualify, subsequent to storing the non-destaged data to the second cache, the second cache for master cache reconfiguration.

17. The computer program product according to claim 16, and comprising computer readable program code configured to configure the second cache as the master cache upon detecting a failure of the first cache.

* * * * *